United States Patent [19]

Onder

[11] 4,115,372
[45] Sep. 19, 1978

[54] NOVEL COPOLYAMIDEIMIDES

[75] Inventor: Kemal B. Onder, North Haven, Conn.

[73] Assignee: The Upjohn Company, Kalamazoo, Mich.

[21] Appl. No.: 761,428

[22] Filed: Jan. 21, 1977

[51] Int. Cl.² .............................................. C08G 73/14
[52] U.S. Cl. .................... 528/73; 260/30.2; 260/30.6 R; 260/30.8 R; 260/30.8 DS; 260/32.4; 260/32.6 N; 260/33.4 P; 260/857 R; 428/458; 428/474; 528/51; 528/55; 528/84
[58] Field of Search .......... 260/47 CB, 47 CP, 63 N, 260/65, 78 TF, 77.5 R, 857 R

[56] References Cited

U.S. PATENT DOCUMENTS

| 3,714,131 | 1/1973 | Hoback et al. | 260/78 TF |
| 3,778,411 | 12/1973 | Emerick et al. | 260/65 |
| 3,817,926 | 6/1974 | Pauze et al. | 260/65 |

Primary Examiner—Lester L. Lee
Attorney, Agent, or Firm—James S. Rose; Denis A. Firth

[57] ABSTRACT

Novel solvent soluble and injection moldable copolyamideimides are disclosed that are characterized in that from about 30 percent to about 70 percent of the recurring units are

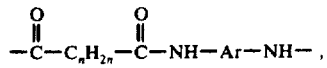

and in the remaining 30–70 percent of the recurring units are

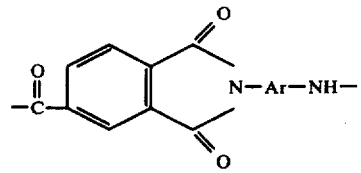

wherein $C_nH_{2n}$ represents alkylene from 7 to 12 carbon atoms, inclusive, and Ar is

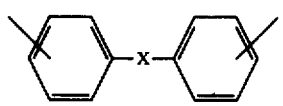

where X = —SO$_2$—, —CO—, —O—, or alkylene (C$_{1-4}$). The copolyamideimides are further characterized by ease of melt processing such as by extruding or injection molding while at the same time prossessing good high temperature stability and unexpectedly high impact and tensile yield strengths.

6 Claims, No Drawings

NOVEL COPOLYAMIDEIMIDES

BACKGROUND OF THE INVENTION

1. Field of the Invention

This invention relates to polyamideimides and is particularly concerned with mixed aromatic-aliphatic copolyamideimides.

2. Description of the Prior Art

Copolyamideimides which contain the residues from trimellitic anhydride and aliphatic dicarboxylic acids in the polymer chains along with an arylene radical are well known in the art. U.S. Pat. No. 3,300,420 discloses organic solvent insoluble polyamideimide reaction products from trimellitic anhydride and aryl polyisocyanates including products wherein up to about 50 mole percent of the trimellitic anhydride may be replaced by an aromatic or aliphatic dicarboxylic acid. Such products are not melt processable. U.S. Pat. No. 3,803,100 describes polyamideimides derived from trimellitic anhydride and arylene diisocyanates that are solvent soluble but infusible and up to 60 mole percent of the trimellitic anhydride may be replaced by an aromatic dicarboxylic acid. U.S. Pat. No. 3,817,926 describes organic solvent soluble polyamideimides in which the trimellitic anhydride constituent may be replaced by up to 75 mole percent of a dicarboxylic acid, inclusive of aliphatic dicarboxylic acids, and this mixture reacted with an organic diamine first, followed by a diisocyanate. The polymer obtained thereby is characterized by a low inherent viscosity, that is to say, low molecular weight which does not give rise to a polymer having good physical properties. Similarly U.S. Pat. No. 3,884,880 discloses trimellitic anhydride-aromatic diisocyanate based copolyamideimides in which up to 50 mole of the anhydride is replaced by an aliphatic dicarboxylic acid wherein the resulting soluble polymers are of low inherent viscosity. U.S. Pat. No. 3,929,691 discloses mixed copolyamideimides containing the trimellitimideamide and aromatic amide residues which are solvent soluble and spinnable but which are not melt processable.

Heretofore, a trimellitic anhydride based copolyamideimide has not been found which is characterized by the combination of organic solvent solubility, fusibility, high molecular weight, and melt processability, as for example injection moldability, all in the same polymer.

The present invention provides copolyamideimides characterized by all of the desirable properties set forth above. Specifically, their molecular weights, as measured by inherent viscosity data, are higher than those polymers disclosed in U.S. Pat. Nos. 3,817,926 and 3,884,880 as noted in Examples 11 and 12 hereinbelow, giving rise to superior polymer properties, and, additionally, they are both solvent soluble and fusible and injection moldable.

SUMMARY OF THE INVENTION

This invention comprises a copolyamideimide characterized by solvent solubility, injection moldability, and an inherent viscosity of at least 0.5 measured at 30° C. using a 0.5 weight percent solution of said copolyamideimide dissolved in N-methylpyrrolidone or m-cresol and is further characterized by having from about 30 percent to about 70 percent of the recurring units of the formula:

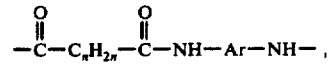

and the remaining 30 percent to 70 percent of the recurring units of the formula:

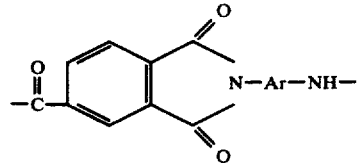

wherein $C_nH_{2n}$ represents alkylene from 7 to 12 carbon atoms, inclusive, and Ar is the divalent radical

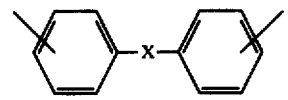

wherein X is selected from the group consisting of $-SO_2-$, $-CO-$, $-O-$, and alkylene from 1 to 4 carbon atoms, inclusive.

The term "alkylene from 7 to 12 carbon atoms, inclusive", means heptylene, octylene, nonylene, decylene, undecylene, dodecylene, including isomeric forms thereof.

The term "solvent" means an inert dipolar aprotic solvent such as dimethylsulfoxide, diethylsulfoxide, dimethylformamide, diethylformamide, dimethylacetamide, diethylacetamide, tetramethylurea, hexamethylphosphoramide, N-methylpyrrolidone, tetramethylenesulfone, dimethylsulfone, diphenylsulfone, and the like, and mixtures of two or more such solvents.

The term "alkylene from 1 to 4 carbon atoms, inclusive", means methylene, ethylene, propylene, butylene, and isomeric forms thereof.

The valencies in the divalent radical Ar are in the para, para' or meta, meta' configurations.

DETAILED DESCRIPTION OF THE INVENTION

The copolyamideimides of the present invention are comprised of the recurring units (I) and (II) set forth above. The proportion of the recurring units having the formula (I) is advantageously from about 30 percent to about 70 percent and preferably from about 40 percent to about 60 percent. Correspondingly, the proportion of the recurring units having the formula (II) is advantageously from about 30 percent to about 70 percent and preferably from about 40 percent to about 60 percent. A particularly preferred proportion is that wherein about 50 percent of the recurring units are of formula (I) and the remaining 50 percent are of formula (II).

The $C_nH_{2n}$ alkylene radical has the definition set forth above. A preferred alkylene radical is $-(CH_2)_n-$ wherein n is an integer from 7 to 12 inclusive, and preferably is from 7 to 10 inclusive, and most preferably, the value of n is 7.

Ar is a divalent radical having the meaning set forth above and illustratively includes 4,4'-oxydiphenylene, 4,4'-sulfonyldiphenylene, 4,4'-carbonyldiphenylene, 4,4'-isopropylidenediphenylene, 4,4'-methylenediphenylene, 3,3'-methylenediphenylene, and the like, and mixtures thereof. A preferred divalent radical Ar is 4,4'-methylenediphenylene.

The valencies of the divalent radical Ar should be in the para, para' or meta, meta' configuration otherwise the polymer chains cannot pack properly and this has a detrimental effect on polymer physical properties.

Combinations of divalent radicals Ar set forth above with minor amounts, up to about 10 mole percent, of arylene radicals, such as m-phenylene, p-phenylene, 2,4-tolylene, 2,6-tolylene, 1,5-naphthylene, 4,4'-bisphenylene, 3,3'-dimethyl-4,4'-methylenediphenylene, and the like, are contemplated by the teaching of the present invention. A preferred combination comprises mixtures of 4,4'-methylenediphenylene with 2,4-tolylene, 2,6-tolylene or both of these arylene radicals.

The copolymers in accordance with the present invention are characterized by ease of melt processing because of reduced polymer crystallinity. For example, molding, extrusion, and injection molding are possible with the absence of polymer degradation and without an increase in polymer shear modulus. Yet, at the same time, the polymers have such high aromatic content that they possess high polymer glass transition temperatures and thereby good high temperature polymer stability (such as heat deflection temperatures).

The copolymers of the invention are further characterized by $\overline{M}_n$ molecular weights of from about 10,000 to about 50,000 as determined by gel permeation chromatography.

Additionally, the copolymers are considered to be random polymers, in contrast to block polymers, and are essentially amorphous in structure. This gives rise to the added advantage of good polymer transparency.

Unexpectedly, the copolymers of the invention are also characterized by very high impact strengths, much higher than heretofore observed for polyamides possessing such high glass transition temperatures.

Furthermore, the copolymers possess surprisingly strong tensile strength at yield, and high elongation, notwithstanding their high aromatic content. The latter is normally recognized by those skilled in the art as giving rise to low tensile and elongation values in polyamide-polyimide type polymers.

Also, in spite of the high aromatic content, the copolymers have good solubility in those solvents normally employed for polyamides. Illustrative of such solvents are the dipolar aprotic solvents set forth above. A further group of solvents in which the polymers of the invention are soluble are the phenolic solvents such as meta-cresol, cresylic acid, and the like. This allows the copolyamideimides of the present invention to be used in those applications calling for solutions such as in the preparation of films, coatings, laminates, and the like.

The term "solvent soluble" means the copolyamideimides are soluble to the extent of at least 5.0 percent by weight in said solvents.

The copolymers are further characterized by showing much lower moisture absorption than polyamides of comparable melt processing characteristics, i.e., a maximum moisture pick-up under equilibrium conditions of about 1.5 to 2.0 percent compared to greater than 6.0 percent for a polyamide such as nylon-6,6 under 100% relative humidity.

The copolyamideimides in accordance with the invention can be prepared by a solution technique similar to that disclosed in U.S. Pat. No. 3,640,970 whose disclosure is hereby incorporated by reference. Typically, the appropriate proportions of the acid halide derivative of trimellitic anhydride and the diacid halide of an alkylene dicarboxylic acid are reacted in solution with the appropriate arylene diamine.

The preferred method of preparation comprises the reaction of the appropriate mixture of trimellitic anhydride (or free acid thereof) and the dicarboxylic acid (III) with the appropriate diisocyanate (IV) in accordance with the following equation

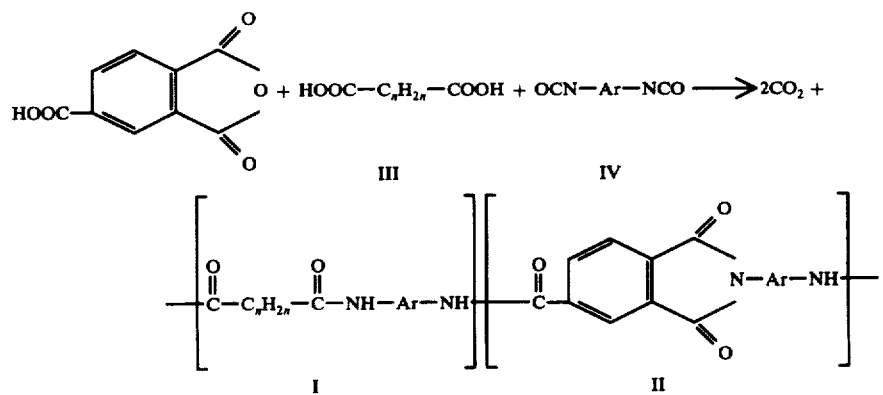

wherein $C_nH_{2n}$ and Ar are defined above. Typical reaction procedures and conditions are described in U.S. Pat. Nos. 3,642,715 and 3,929,691 whose disclosures are hereby incorporated by reference.

Illustratively, the mixture of trimellitic anhydride and the dicarboxylic acid (III), in the proportions which will result in the proportions of the recurring units (I) and (II) set forth above, are dissolved in one of the dipolar aprotic solvents set forth above. A particularly preferred solvent for the reaction is tetramethylenesulfone.

Generally speaking the solution is maintained at about 100° C. to about 225° C. and preferably about 125° C. to about 175° C. while the arylene diisocyanate (IV) dissolved in the same solvent used for the anhydride and dicarboxylic acid is slowly added to the well stirred solution.

The progress of the polymerization reaction is easily monitored by any suitable analytical method known to one skilled in the polymer art. A particularly suitable method is infrared analysis. The characteristic absorptions arising from the isocyanate groups of the organic diisocyanate (4.4μ), the carboxylic acid group (5.85μ), along with the characteristic absorption of the amide group (6.00μ), allow for the facile determination of the progress and completion of the polymerization. The reaction is continued until the diisocyanate and dicarboxylic compound are no longer detectable by infrared absorption analysis.

The soluble copolyamideimides may be left in their reaction solutions, which, incidentally, will normally contain from about 10 percent by weight to about 40 percent by weight of polymer. In this form, the copolyamideimides are easily formed into films, coatings, fibers, laminates and the like.

Alternatively, the copolyamideimides are easily isolated from their reaction solutions simply by removing the solvent using distillation, vacuum distillation, thin film evaporation, and the like. A preferred mode of isolation of the polymers comprises their precipitation in solid form by pouring the polymer solutions into a non-solvent for said polymers. Typical non-solvents include water, acetone, methylethyl ketone, methanol, ethanol, isopropanol, and the like, and mixtures thereof.

Generally speaking, the solid polymer precipitates out in spaghetti-like strands which are easily chopped, or ground, into powder form and washed using any mixing technique known to one skilled in the art in the same nonsolvent used for the original precipitation. They can then be dried using ovens, vacuum trays, or any suitable means known to one skilled in the art for removing volatile liquids from solid powders.

Generally speaking, the use of a polymerization catalyst is advantageous and is used in a range of about 0.001 percent to about 0.3 percent by weight of total reactants, preferably from about 0.02 percent to about 0.20 percent. A preferred group of catalysts for the polymerization of diisocyanates and dicarboxylic acids and carboxylic anhydrides are the N-alkali metal lactamates such as potassium propiolactamate, potassium pyrrolidone, sodium caprolactamate, and the like, and the alkali metal alkoxides, such as sodium methoxide, sodium ethoxide, sodium phenoxide, and the like, disclosed in copending applications Ser. No. 521,745 filed Nov. 7, 1974, and Ser. No. 521,744 filed Nov. 7, 1974 respectively.

A most preferred group of catalysts are the phospholene-1-oxides or 1-sulfides, and the phospholane-1-oxides, or 1-sulfides described in U.S. Pat. Nos. 2,663,737, 2,663,738, and 2,663,739. Particularly preferred members of this group include 1,3-dimethyl-2-phospholene-1-oxide, 1,3-dimethyl-3-phospholene-1-oxide, and mixtures thereof.

Illustrative of the diacids (III) that can be used in the present invention are, 2,4,4, or 2,2,4-trimethyladipic acid, azelaic acid, sebacic acid, undecanedioic acid, dodecanedioic acid, brassylic or tridecanedioic acid, and tetradecanedioic acid.

Illustrative of the diisocyanates (IV) that can be used in the present invention are, 4,4'-diisocyanatodiphenylether, 4,4'-diisocyanatodiphenylsulfone, 2,2-(4,4-diisocyanatodiphenyl)propane, 4,4'-diisocyanatobenzophenone, 4,4'-diisocyanatodiphenylmethane, 3,3'-diisocyanatodiphenylmethane, and the like, and mixtures thereof.

Additives such as antioxidants, dyes, fire retardants, and the like may be added to solutions of the polymers of the present invention in solvents of the type set forth above. Alternatively the additives may be added to the dry powdered polymers either prior to or during processing steps such as molding, extruding, injection molding and the like.

The copolyamides prepared in accordance with the present invention can be used as molding powders, for the preparation of fibers and coatings from solution, for injection molding of articles, and the like. The solid polymers so obtained can be used in bushings, seal faces, electric insulators, compressor vanes and impellers, pistons and piston rings, gears, thread guides, cams, brake lining, clutch faces, abrasive articles. Further, coatings of the copolyamides of the present invention are useful in wire coating, in casting films, or spraying polymer films on a variety of substrates such as metal, ceramic, fabrics, polymerics, and the like.

The following examples describe the manner and process of making and using the invention and set forth the best mode contemplated by the inventors of carrying out the invention but are not to be construed as limiting.

EXAMPLE 1

A mixture of 18.82 g. (0.1 mole) of azelaic acid, 19.21 g. (0.1 mole) of trimellitic anhydride and 0.07 g. (0.00053 mole) of 1,3-dimethyl-3-phospholene-1-oxide was charged to a dry 500 ml. round bottom flask fitted with gas inlet tube, stirrer, condenser and addition funnel. To the mixture was added 298 ml. of tetramethylenesulfone which had been previously distilled under vacuum. The resulting mixture was stirred under an atmosphere of nitrogen and heated to 150° C. at which point the mixture was a clear pale yellow solution. The temperature was maintained at 150° C. while a total of 50.05 g. (0.2 mole) of 4,4'-methylenebis(phenylisocyanate) in 60 ml. of tetramethylenesulfone was added dropwise over a period of 6 hours and 40 minutes. The mixture was then cooled to room temperature (circa 20° C.) and poured, with stirring, into an excess of acetone. The solid which separated was isolated by filtration and then washed by suspending the product in water with vigorous stirring, isolating the washed product by filtration, resuspending the solid in acetone with vigorous stirring, and finally isolating by filtration followed by drying. There was thus obtained 70 g. of a polyamideimide in which 50 percent of the recurring units had the formula

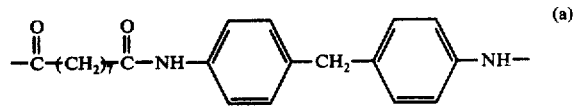
(a)

and in the remaining 50 percent of the recurring units had the formula

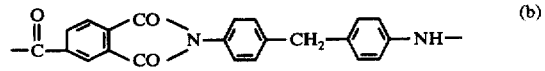
(b)

A sample of the polyamideimide was dried at 170° C. for 12 hours. The inherent viscosity of this sample (0.5 percent in N-methylpyrrolidone at 30° C.) was found to be 1.25.

The above procedure was repeated and a sample of the powdered polymer so obtained was blended with 2 percent by weight of an antioxidant (Irganox 1098) and extruded through a ⅛ inch diameter die using a Brabender extruder. The barrel temperature in Zones 1 and 2 of the latter was 270° C., in Zone 3 265° C. and the temperature of the die was 260° C. The screw speed was 50 rpm with a 4:1 compression ratio. The extrudate was smooth with no melt fracture. The extruded strands were pelletized using a cutter and the pelletized material was then injection molded using an Arburg reciprocating screw injection molding machine to produce test bars for examination of tensile and flexural strength properties under the following conditions

|  | Tensile Bars | Flexural Bars |
| --- | --- | --- |
| Temperature ° C |  |  |
| Barrel - Zone 1 | 270 | 270 |
| Zone 2 | 270 | 270 |
| nozzle | 270 | 270 |
| mold | 160 | 150 |
| Injection pressure: psi | 8700 | 10200 |
| Injection speed setting | 4.2 | 4.2 |
| Screw speed | 120 | 120 |
| Back pressure psi | 0 | 0 |
| Injection time : seconds | 12 | 12 |
| Mold close : seconds | 35 | 35 |

The following physical properties of the polymer were determined using the test bars so prepared.

| Tensile strength (yield) psi | 14,050 |
| --- | --- |
| (break) psi | 12,500 |
| Tensile modulus psi | 330,000 |
| Elongation (break) % | 16.5 |
| Elongation (yield) % | 8.4 |
| Flexural strength psi | 17,240 |
| Flexural modulus psi | 323,600 |
| IZOD Impact strength |  |
| unnotched ft.lbs./in. | >20 |
| notched ft.lbs./in. | 3.04 ¼" thick bar |
|  | 6.07 ⅛" thick bar |
| Heat distortion temperature |  |
| at 264 psi  ° C | 150 |

EXAMPLE 2

The procedure described in Example 1 was repeated except that the amount of azelaic acid was increased to 22.58 g. (0.12 mole), the amount of trimellitic anhydride was decreased by a corresponding amount to 15.37 g. (0.08 mole), the amount of 1,3-dimethyl-3-phospholene-1-oxide was increased to 0.10 g. (0.00076 mole) and the amount of tetramethylenesulfone was reduced to 164 ml. to give a mixture with 20 percent by weight of solids. In spite of the increased concentration of solids so achieved, the final reaction mixture was still sufficiently low in viscosity to be handled by standard stirring equipment. The resulting polyamideimide was worked up as described in Example 1 and a sample was dried under vacuum at 88° C. The dried sample showed inherent viscosity (0.5 percent in m-cresol) at 30° C. of 1.12 and under the same conditions in N-methylpyrrolidone the inherent viscosity was 1.16. Said polyamideimide had 60 percent of recurring units of formula (a) [see Example 1] and 40 percent of formula (b).

EXAMPLE 3

The procedure described in Example 1 was repeated except that 26.35 g. (0.14 mole) of azelaic acid, 11.53 g. (0.06 mole) of trimellitic anhydride, and 0.07 g. of 1,3-dimethyl-3-phospholene-1-oxide were dissolved in 163 ml. of tetramethylenesulfone and heated by an oil bath to about 170° C. The addition of the 50.05 g. (0.20 mole) of 4,4'-methylenebis(phenylisocyanate) dissolved in 60 ml. of tetramethylenesulfone was stopped when greater than 95% of the solution had been added because the solution viscosity started to increase rapidly.

A portion of the resulting polyamideimide which had formed a solidified mass in the flask was ground to a powder in a Waring Blendor using deionized water. Three consecutive water washes were performed with filtration of the solid between each wash. The polymer was left standing overnight in water. It was filtered then washed 4 times in acetone and stirred for 2½ days in 1400 ml. of acetone. It was filtered, washed with fresh acetone and finally dried at 168° C. for 14 hours. The dried sample showed an inherent viscosity (0.5 percent in m-cresol) at 30° C. of 1.31. Said polyamideimide had 70 percent of recurring units of formula (a) [see Example 1] and 30 percent of formula (b).

EXAMPLE 4

The procedure described in Example 1 was repeated except that 24.47 g. (0.13 mole) of azelaic acid, 13.45 g. (0.07 mole) of trimellitic anhydride, and 0.07 g. of 1,3-dimethyl-3-phospholene-1-oxide were dissolved in 200 ml. of tetramethylenesulfone and heated in an oil bath at 161° C. (reaction solution temperature was 159° C.). The 50.05 g. (0.20 mole) of 4,4'-methylenebis(phenylisocyanate) dissolved in 55 ml. of tetramethylenesulfone was added over a 6 hour addition period. The bath temperature was increased to about 166° C. and stirring of the reaction solution continued for an additional ½ hour period.

The clear yellow polymer solution was poured into a container of cold water to form precipitated spaghetti strands. The strands were chopped up in water using a Waring blendor, filtered, then the chopping repeated in the blendor. The granular polymer was washed twice in acetone followed by an overnight wash in acetone. It was filtered, washed with fresh acetone, filtered, dried first at 50° C. and finally under vacuum at 160° C. for 17 hours. The dried sample showed an inherent viscosity (0.5 percent in m-cresol) at 30° C. of 1.31. Said polyamideimide had 65 percent of recurring units of formula (a) [see Example 1] and 35 percent of formula (b).

EXAMPLE 5

The procedure described in Example 1 was repeated except that 15.37 g. (0.082 mole) of azelaic acid, 22.59 g. (0.118mole) of trimellitic anhydride, and 0.08 g. of 1,3-dimethyl-3-phospholene-1-oxide were dissolved in 195 ml. to tetramethylenesulfone and the solution heated by an oil bath at about 151° C. The 50.05 g. (0.20 mole) of 4,4'-methylenebis(phenylisocyanate) dissolved in 60 ml. of tetramethylenesulfone was added over 5½ hours. The polymer solution was precipitated using the same isolation and purification procedure described in Example 4. The polymer was dried at 170° C. in vacuum for 15 hours. The dried sample showed an inherent viscosity (0.5 percent in N-methylpyrrolidone) at 30° C. of 0.975. Said polyamideimide had 40 percent of the recurring units of formula (a) [see Example 1] and 60 percent of formula (b).

EXAMPLE 6

The procedure described in Example 1 was repeated except that 11.29 g. (0.06 mole) of azelaic acid, 26.90 g. (0.14 mole) of trimellitic anhydride, and 0.07 g. of 1,3-dimethyl-3-phospholene-1-oxide were dissolved in 235 ml. of tetramethylenesulfone and the solution heated in an oil bath at about 160° C. After about 70 percent of the 50.05 g. (0.20 mole) of 4,4'-methylenebis(phenylisocyanate) dissolved in 60 ml. of tetramethylenesulfone had been added a precipitate was observed.

The bath temperature was raised to 180° C. and the addition continued until completed which took a total of about 6 hours. About ½ hour after the addition was completed an aliquot of the mixture was analyzed by infrared analysis which showed the absence of unreacted isocyanate or anhydride. The polymer solution was precipitated using the same isolation and purification procedure described in Example 4. The polymer was dried at 163° C. in vacuum for 18 hours. The dried sample showed an inherent viscosity (0.5 percent in N-methylpyrrolidone) at 30° C. of 0.52. Said polyamideimide had 30 percent of the recurring units of formula (a) [see Example 1] and 70 percent of formula (b).

EXAMPLE 7

About 7.8 g. of each of the powdered polymers obtained from a repeat of Example 1, and from Examples 2, 3, 4, 5, and 6 respectively were dry blended with about 2 percent by weight of Irganox 1098. Each polymer sample was molded in a 2 inch disc mold at a temperature of from about 250° C. to about 280° C. under a force of about 14,000 to 16,000 lbs. Test bars were cut from each molded piece and their respective glass transition temperatures (Tg) determined from the Gehman plot of shear modulus vs. temperature determined using the procedure of ASTM D1058-58T on a modified Gehman Torsion Stiffness Tester, fitted with a heavy duty furnace to allow operation up to 500° C. The Tg values and the corresponding mole percentages of trimellitimideamide (TMA) to azelamide (Az) afre set forth in Table I.

TABLE I

| Sample derivation | Mole % TMA/Az | Tg(° C) |
|---|---|---|
| Example 3 | 30/70 | 224 |
| Example 4 | 35/65 | 164 |
| Example 2 | 40/60 | 170 |
| Repeat of Ex. 1 | 50/50 | 183 |
| Example 5 | 60/40 | 188 |
| Example 6 | 70/30 | 208 |

All of the samples displayed a decreasing shear modulus which was either rapidly approaching, or else, well below $10^8$ dynes/cm$^2$ in a temperature range of about 220° C. to 300° C. which clearly showed their melt processability.

EXAMPLE 8

The procedure described in Example 1 was repeated in three separate polymerizations using the same ingredients in each reaction except that the phospholene oxide catalyst was replaced by 0.08 g. of sodium methoxide, 0.07 g. of lithium phenoxide, and 0.07 g. of triphenylarsine oxide respectively as the catalyst component. The polyamideimides obtained in each polymerization were characterized by an inherent viscosity determined in N-methylpyrrolidone at 0.5 percent concentration by weight at 30° C. and set forth below.

| Catalyst Component | ηinh |
|---|---|
| Sodium methoxide | 0.63 |
| Lithium phenoxide | 1.00 (some insolubles) |
| Triphenylarsine oxide | 0.62 |

EXAMPLE 9(i)–9(iv)

Using the procedure and ingredients described in Example 1 except that the azelaic acid is replaced by an equivalent amount of one of the following α,ω-alkylenedicarboxylic acids, (i)–(iv)

(i) sebacic acid
(ii) undecanedioic acid
(iii) dodecanedioic acid
(iv) tridecanedioic acid(brassylic acid)

there are obtained polyamideimides 9(i)–9(iv) in accordance with the present invention in which each polymer has 50 percent of the recurring units according to the respective formula below

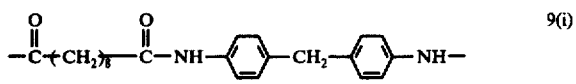

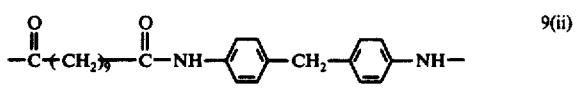

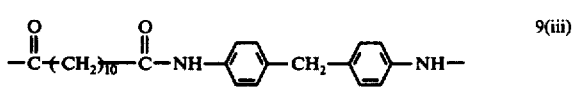

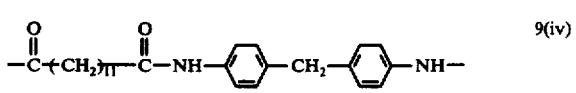

while the remaining 50 percent of the recurring units have the formula (b) [see Example 1].

EXAMPLE 10(i)–10(iii)

Using the procedure and ingredients described in Example 1 except that the 4,4'-methylenebis(phenylisocyanate) is replaced by an equivalent amount of one of the following arylene diisocyanates (i) 4,4'-diisocyanatodiphenylether
(ii) 4,4'-diisocyanatodiphenylsulfone
(iii) 3,3'-diisocyanatodiphenylmethane there are obtained polyamideimides 10(i)–10(iii) in accordance with the present invention in which each polymer has 50 percent of the recurring units having the formula

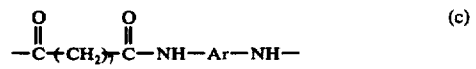

and the remaining 50 percent of the recurring units having the formula

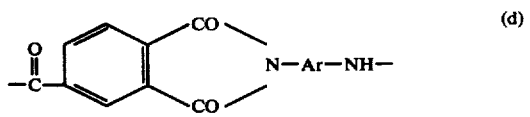

and the arylene radical Ar in the respective polyamideimides corresponds to the following (i) 4,4'-oxydiphenylene
(ii) 4,4'-sulfonyldiphenylene
(iii) 3,3'-methylenediphenylene

EXAMPLE 11

In order to illustrate the marked difference in properties between the polymers of the invention and closely related polymers described in the prior art, the following polyamideimide, not in accordance with the present invention, was prepared, using the procedure set forth in U.S. Pat. No. 3,884,880, Example XI, from trimellitic anhydride and azelaic acid in the molar proportion of 1:1.

Into a 500 ml. resin flask was carefully weighed 19.21 g. (0.1 mole) of trimellitic anhydride (TMA). The flask was then fitted with a nitrogen inlet, condenser, drying tube and stainless steel stirring assembly. The apparatus was flame dried and 50.05 g. (0.20 mole) 4,4'-methylenebis(phenylisocyanate) (MDI) was weighed into a 125 ml. Erlenmeyer flask. It was carefully added to the reactor. A total of 46 ml. of o-dichlorobenzene was used to wash out the remaining contents into the reactor.

A slow rate of mixing was started and heating of the contents of the flask was begun by an oil bath. The rate of heating was around 2° C./minute. Slowing the TMA began to dissolve as reaction began to occur. At about 60° C., the reaction appeared to go faster as vigorous evolution of $CO_2$ was observed in an attached bubbler.

Slowly the still heterogenous mixture began to acquire a yellow color. The temperature was raised to approximately 160° C. The yellow solution was not entirely clear, but appeared somewhat cloudy. The time to reach 160° C. was about 2 hours. Additional stirring and heating was continued for approximately ½ hour, with no apparent change in the solution; it was still cloudy. An IR at this point showed the expected —NCO absorption, and also the presence of a considerable amount of unreacted anhydride, some amide was also present. Five 3.81 g. portions of azelaic acid, totalling 19 g. (0.1 mole) were added every 20 minutes. With the addition of each portion, the viscosity increased as reaction proceeded. When all the azelaic acid had been added the conc. of the reaction was 54.2%, some additional o-dichlorobenzene, about 5 ml., was added to wash down azelaic acid at the top of the reactor.

Reaction was allowed to proceed for one hour after all the azelaic acid had been added. By this time the viscosity was high and the rate of stirring was decreased because material was climbing the stirrer shaft. The reaction was stopped at this point and the polymer was allowed to cool down to a hard, brittle glass-like solid mass overnight.

A small portion of the polymer was vacuum dried directly to remove the solvent. Drying was donw at 150° C. overnight, then at 160° C. for several hours. The polymer obtained was somewhat tacky and infrared analysis showed unreacted —NCO and anhydride.

The remainder of the polymer was chopped in 2-propanol twice into granular, yellow particles. The polymer was then vacuum dried at a maximum temperature of 160° C. for several hours. It was observed that the material had fused and rose somewhat like a foam. Thermal gravimetric analysis of this material showed a substantial weight loss of about 3.1% beginning very early at 220° C. The inherent viscosity was $\eta_{0.5} = 0.273$ in N-methylpyrrolidone at 30° C. indicating low polymer molecular weight and is much lower than the $\eta$inh values of the polymers of the present invention.

A 2 inch disc was molded at 195° C. at 4,000 psi. The piece was very brittle and could not be evaluated because of its lack of structural integrity.

EXAMPLE 12

For the same purposes of comparison as set forth in Example 11, a second polyamideimide, not in accordance with the present invention, was prepared, using the procedure set forth in U.S. Pat. No. 3,817,926, Example 7, from trimellitic anhydride and azelaic acid in the molar proportion of 1:1.

Into a 500 ml. resin flask was carefully weighed 47.5 g. (0.25 mole) of azelaic acid and 48.00 g. (0.25 mole) of TMA. The flask was then equipped with a nitrogen inlet, stainless steel stirring assembly, Dean Stark trap with condenser and drying tube. After carefully flame drying the apparatus, it was left to sit overnight under $N_2$.

A 50/50 v/v mixture of m-cresol and phenol was prepared. 67 ml. of this solution was added to the resin flask along with 17 drops (0.25 g.) of triphenyl phosphite catalyst. 89.1 g. (0.45 mole) of 4,4'-methylenedianiline (MDA) was added also to the flask. Heating in an oil bath was begun along with slow stirring. Gradually the solids began to dissolve forming orange colored solution. At about 142° C. distillate began to collect in the Dean Stark tube. The temperature was increased to a maximum of 223° C. and the reaction was allowed to proceed at that temperature for about 2 hours. A total of 17.5 ml. $H_2O$ was collected; this being greater than the theoretical amount of 16.2 ml. Some phenol presumably was carried over with distilling $H_2O$. At this time, the reaction temperature was lowered to about 190° C. 12.5 g. (0.05 mole) of 4,4'-methylenebis-(phenylisocyanate) (MDI) was dissolved in a small amount (5 ml.) of the cresol-phenol solvent and quickly added to the reactor. An additional 15 ml. of solvent was added bringing the concentration of the reaction to 70.5 percent solids.

Vigorous stirring was continued and the reaction mixture maintained at 193° C. for 3 hours.

Finally, the reaction was allowed to cool down to room temperature after stopping agitation. Solid glass-like material was broken into small chunks and ground into powder in 2-propanol in a Waring blender and left to soak in acetone over the weekend. After filtering the powdery polymer was vacuum dried at 160° C. for 14½ hours, then finally at 170° C. for 2¼ hours.

Thermal gravimetric analysis showed a loss of 2.1 percent by weight beginning at 220° C. ending at 350° C. The inherent viscosity was $\eta_{0.5} = 0.233$ in N-methylpyrrolidone at 30° C. and, similarly to the polymer of Example 11, is much lower than the $\theta$inh values of the polymers of the present invention.

A 2 inch disc was molded at 187° C. and 4000 psi. A brittle piece resulted which could not be tested because of its lack of structural integrity.

I claim:

1. A copolyamideimide characterized by solvent solubility, injection moldability, and an inherent viscosity of at least 0.5 measured at 30° C. using a 0.5 weight percent solution of said copolyamideimide dissolved in N-methylpyrrolidone or m-cresol and further characterized by having from about 30 percent to about 70 percent of the recurring units of the formula:

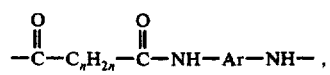

and the remaining 30 percent to 70 percent of the recurring units of the formula:

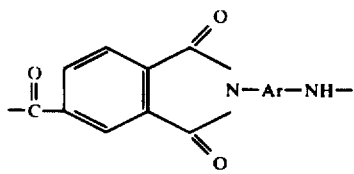

wherein $C_nH_{2n}$ represents alkylene from 7 to 12 carbon atoms, inclusive, and Ar is the divalent radical

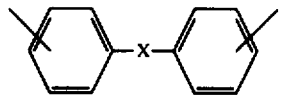

wherein X is selected from the group consisting of $-SO_2-$, $-CO-$, $-O-$, and alkylene from 1 to 4 carbon atoms, inclusive.

2. A copolyamideimide according to claim 1 wherein said $C_nH_{2n}$ has the formula $+CH_2 \cdot)_n$ wherein $n$ is an integer from 7 to 12 inclusive.

3. A copolyamideimide according to claim 1 wherein said divalent radical Ar is 4,4'-methylenebis(phenylene).

4. A copolyamideimide characterized by solvent solubility, injection moldability, and an inherent viscosity of at least 0.5 measured at 30° C. using a 0.5 weight percent solution of said copolyamideimide dissolved in N-methylpyrrolidone or m-cresol and further characterized by having from about 40 percent to about 60 percent of the recurring units of the formula:

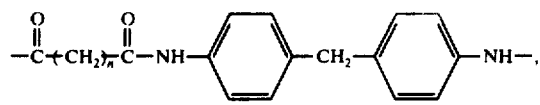

wherein $n$ is an integer from 7 to 12 inclusive, and the remaining 40 percent to 60 percent of the recurring units of the formula:

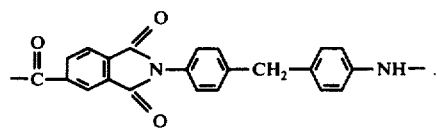

5. A copolyamideimide according to claim 4 wherein said $n = 7$.

6. A copolyamideimide according to claim 5 wherein about 50 percent of the recurring units are

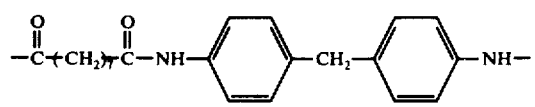

and the remaining 50 percent are

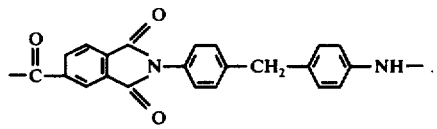

* * * * *